(12) United States Patent
Allen

(10) Patent No.: US 7,509,795 B2
(45) Date of Patent: Mar. 31, 2009

(54) SYSTEMS AND METHODS FOR PLASMA PROPULSION

(75) Inventor: Edward H. Allen, Lancaster, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 530 days.

(21) Appl. No.: 11/036,719

(22) Filed: Jan. 13, 2005

(65) Prior Publication Data
US 2006/0150611 A1    Jul. 13, 2006

(51) Int. Cl.
F03H 1/00 (2006.01)
(52) U.S. Cl. ........................................ 60/202
(58) Field of Classification Search ............... 60/202, 60/203.1, 204
See application file for complete search history.

(56) References Cited

U.S. PATENT DOCUMENTS

| | | | | |
|---|---|---|---|---|
| 4,862,032 A | * | 8/1989 | Kaufman et al. | 313/359.1 |
| 4,891,600 A | * | 1/1990 | Cox | 315/501 |
| 5,924,278 A | * | 7/1999 | Burton et al. | 60/203.1 |
| 6,293,090 B1 | * | 9/2001 | Olson | 60/203.1 |
| 6,334,302 B1 | * | 1/2002 | Chang-Diaz | 60/203.1 |
| 6,449,941 B1 | * | 9/2002 | Warboys et al. | 60/202 |
| 6,640,535 B2 | * | 11/2003 | Gallimore et al. | 60/202 |
| 6,751,943 B2 | * | 6/2004 | Meholic et al. | 60/204 |
| 6,834,492 B2 | | 12/2004 | Hruby et al. | |
| 6,996,972 B2 | * | 2/2006 | Song | 60/202 |
| 7,096,660 B2 | * | 8/2006 | Keady | 60/203.1 |
| 2002/0088219 A1 | * | 7/2002 | Meholic et al. | 60/204 |
| 2002/0194833 A1 | * | 12/2002 | Gallimore et al. | 60/202 |
| 2003/0136108 A1 | * | 7/2003 | Meholic et al. | 60/204 |
| 2005/0257515 A1 | * | 11/2005 | Song | 60/202 |

* cited by examiner

Primary Examiner—William H Rodriguez
(74) Attorney, Agent, or Firm—Koestner Bertani LLP; Mary Jo Bertani

(57) ABSTRACT

A plasma propulsion system for aerospace and other applications is disclosed in which an ionized fluid is accelerated through the system by an electric field. The electrons separated from the ionized fluid are accelerated in a direction opposite the ionized flow. A magnetic field decelerates the electrons. The decelerated electrons are collected, conducted downstream, and re-inserted into the ionized flow.

21 Claims, 4 Drawing Sheets

SYSTEMS AND METHODS FOR PLASMA PROPULSION

BACKGROUND

Under the laws of thermodynamics, engines fueled by chemical reactions, e.g., reduction-oxidation (redox) reactions, require a substantial positive temperature differential between the inlet air, which must be cold and the exhaust gas, which must be hot. As a jet engine accelerates, especially above Mach 1, the temperature of the inlet air rises rapidly while the temperature of the exhaust gas rises more slowly, so the temperature differential diminishes. Eventually the temperature differential is extinguished and no positive work can be withdrawn from the engine, so it ceases to produce thrust. This happens at Mach 4 or so for a conventional turbine. One approach to higher speed attempts to avoid the inlet air temperature rise by compressing and decelerating the flow less and running the combustion process at supersonic speed. This approach is embodied in the supersonic combustion ram jet (scram jet). Compression is required to generate work, so the scram jet delays the onset of zero thrust to higher speed (Mach 8-10 range). The scram jet cannot overcome the problem of diminishing temperature differential and so, it too, is speed limited.

In chemical propulsion, the specific impulse is limited by the energy available when molecules combine. In contrast, with electric propulsion, energy is added from an external source. In principle, therefore, the specific impulse of electric propulsion can be as large as desired. In practice, the specific impulse is limited by the particular implementation. Since thrust will decrease as the specific impulse increases for a given power, a tradeoff must be made for a particular mission between propellant usage and mission time. High specific impulse leads to low propellant usage.

Plasma (also referred to as ionized gas) is an energetic state of matter in which some or all of the electrons have become separated from the atom. Excitation of a plasma requires then, at least partial ionization of neutral atoms and/or molecules of a medium. There are several ways to cause ionization including collisions of energetic particles, strong electric fields, and ionizing radiation. The energy for ionization may come from the heat of chemical or nuclear reactions of the medium, as in flames, for instance.

There are two broad categories of plasma, hot plasma and cold plasma. In a hot plasma, full ionization takes place, and the ions and the electrons are in thermal equilibrium. A cold plasma (also known as a weakly ionized plasma) is one where only a small fraction of the atoms in a gas are ionized, and the electrons reach a very high temperature, whereas the ions remain at the ambient temperature or slightly above. Cold plasma can be created by using a high electric field, or through electron bombardment from an electron gun, or by other means There are three main types of electric thrusters: electrothermal, electromagnetic, and electrostatic. Electrothermal thrusters are similar to standard chemical rocket engines in that heat energy is added to a working fluid in a confined volume, raising its pressure, but differ in that the heat is produced by electrical means (often an electrical discharge). The gas is subsequently expanded through a converging-diverging nozzle to achieve thrust just as in chemical rockets. There are a variety of electromagnetic thruster configurations, but all depend on generating a thrust by accelerating particles in a direction perpendicular to both the electric and magnetic fields in the plasma. For example, the pulsed plasma microthruster (PPT) utilizes a spark discharge across a block of TEFLON® to create plasma, which is accelerated outward by induced azimuthal current interacting with a radial magnetic field. In a Hall thruster, an axial electric field provided in a radial magnetic field creates an azimuthal Hall current, which accelerates plasma axially producing thrust. In the self-field magnetoplasmadynamic (MPD) thruster, the current flow creates its own magnetic field in which the jxB force accelerates the plasma flow radially and axially. This can only occur if the current and hence the power are high, often necessitating pulsed operation at lower average powers. Electrostatic thrusters accelerate charged particles in an electric field, without an applied magnetic field. A linear accelerator, such as the one installed at the Stanford University Linear Accelerator Center (SLAC) is an example of an electrostatic thruster, though it is not used for the production of thrust.

In general, electromagnetic thrusters have much higher specific impulse than electrothermal thrusters. Electromagnetic thrusters are more compact than electrostatic ion thrusters because a charge neutral plasma does not have a space charge limitation on density. Problems include electrode erosion and general complexity of flow and current fields. The PPT thruster is mature and simple, but does not scale up to large powers.

Electrostatic ion thrusters use a set of grids to accelerate charged ions. Electrons are also expelled separately to maintain charge neutrality and prevent a charge buildup which could shut off the ion beam. Heavy gases such as mercury vapor and xenon have been used to reduce ionization losses as a fraction of total energy. Ionization losses are approximately the same for most gases, whereas for a given exhaust velocity the energy added per ion is greater for heavier gases.

In electrostatic thrusters, the beam consists of ions only and repulsion between particles limits the maximum density to relatively low levels, sometimes called the "space charge effect". The space charge effect limits electrostatic thrusters to significantly lower thrust than other types of electric thrusters.

Consequently, there is no chemical-fuel based airbreathing propulsion system that can enable hypersonic flight in the range above Mach 10 or so and up to orbital speed. The range above Mach 10 is important because it would provide access to orbit without a rocket concept. The drawback of the rocket is largely size and, therefore, cost. A rocket capable of reaching the moon will typically have a fuel mass fraction of 90%+; of that fuel mass, 85% will be oxidizer. An airbreathing concept, as disclosed here in, would permit most of the oxidizer mass to be left off the vehicle.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE FIGURES

Figure 1:
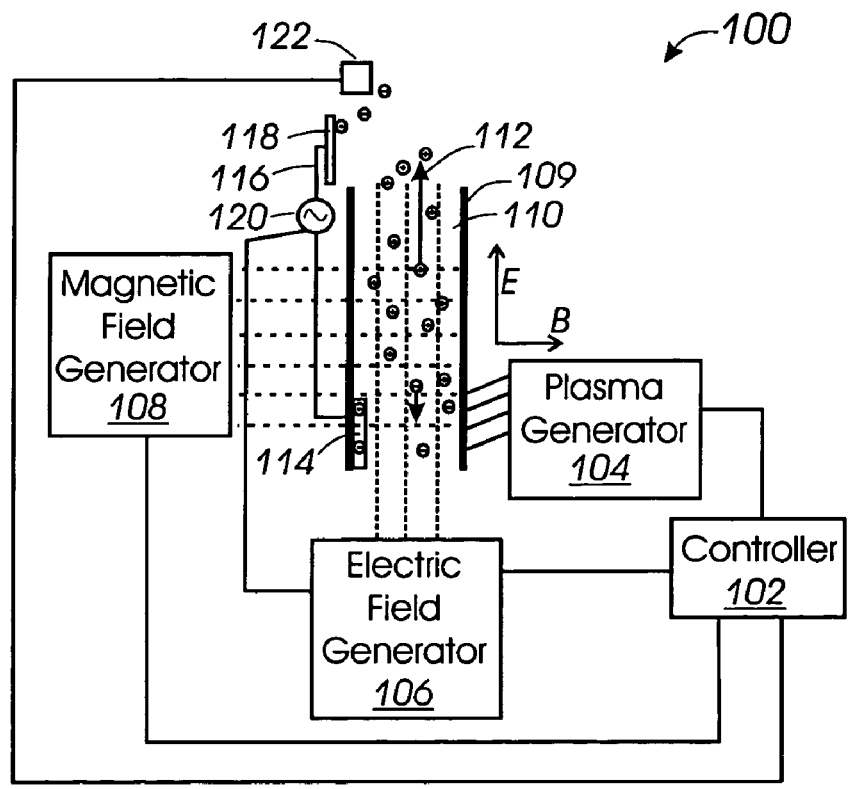
FIG. 1 is a diagram of an embodiment of a plasma propulsion system.

FIG. 1 shows a diagram of components that can be included in some embodiments of airbreathing plasma propulsion system 100, including controller 102 coupled to operate plasma generator 104, electric field generator 106, and magnetic field generator 108. Working fluid (air) flows through the plasma propulsion system housing 109. Plasma generator 104 can be configured to generate plasma from working fluid in housing 109. Electric field generator 106 can be configured to accelerate the plasma within a cavity 110 enclosed by housing 109 toward an opening in housing 109. Controller 102 controls the electric field produced by electric field generator 106 to cause the ionized fluid to form a plasma flow 112 through the opening.

The electric and magnetic fields can be orientated to generate the greatest net thrust. If only an electric field is applied, the positive and negative particles will be accelerated in opposite directions. Given the Law of Conservation of Momentum, each particle attains equal but opposite momentum and there is no net change in momentum; equal but opposite thrust (which is based on the time rate of change of momentum) implies zero net thrust. The magnetic field is then applied to cause the electrons to spiral around the magnetic field lines and thus progress through the electric field much more slowly than they would otherwise. The magnetic field can be oriented in any direction that forces the electrons to take a longer path through the electric field than the ions. Thus, one way to regulate the thrust generated by the invention is to control the intensity and orientation of the magnetic field. As shown, the magnetic field B is applied normal to the direction of plasma flow 112, which creates the largest force on the electrons, mitigating the momentum of the electrons, and creating the maximum net thrust.

The term "airbreathing plasma propulsion system" as used herein refers to thrust-generators that produce momentum by means of electromagnetic fields accelerating ions created from the free air rather than from a fuel supply carried onboard. When the airbreathing plasma propulsion system is functionally equivalent to the system disclosed herein it is referred to as a "Plasma Fuel Engine" or "PFE". Fuel may be carried to generate the electricity consumed by propulsion system 100. Neither the fuel nor its combustion products need be run through propulsion system 100 for propulsion system 100 to function, however, the fuel/combustion products can optionally be run through the system and may improve the output of propulsion system 100.

The Lorenz equation relates the electromagnetic force on a moving charged particle to the vector sum of the electric field and the cross product of the particle's velocity with the magnetic field as follows:

$$F = q(E + v \times B)$$

where F is the force on the particle, q is the charge of the particle, E is the strength of the electric Field, v is the speed of the particle, and B represents the strength of the magnetic field. Clearly, the magnetic field will not exert force on a charged particle if the velocity of the charged particle (with respect to that field) is zero. By contrast, the electric field will exert force on the particle regardless of the particle's velocity. The Lorenz equation thus implies that kinetic energy can be added to a moving ion by an electrical field, but not by a magnetic field. Accordingly, plasma propulsion system 100 is configured to place a positive and negative charged particle in close proximity, and subject both to an electric field that accelerates the positive charged particles in the opposite direction of the negative charged particles.

Plasma propulsion system 100 requires that of the two types of particles present in the plasma (positive and negative) be of substantially different masses, so that, given the same force, particles of one charge accelerate faster than particles of the opposite charge. The charge-to-mass ratio of an electron is on the order of $1.8 \times 10^{11}$ while the average air ion has a charge-to-mass ratio of $3.3 \times 10^6$ (in coulombs per kilogram), which is five orders of magnitude difference. Given a constant magnetic field, the electrons will accelerate to very high velocity while during the same time period the ions will accelerate only to velocity five orders of magnitude less. The speed differential implies the electrons will be strongly affected by a magnetic field, while the ions will be affected only very weakly by comparison. Thus, the magnetic field can be used to sort between the charged particles, letting the heavier particle fall under the influence of the electric field alone while the light particles feel the influence of both electric and magnetic fields. The electrons thus collected by and trapped in the magnetic field can be conducted through electrodes and an external electrical circuit and re-inserted into plasma flow 112 downstream of propulsion system 100 to maintain charge neutrality.

The force of magnetic field B mitigates the momentum of the electrons, which aids collection of the electrons by a positive electrical terminal, such as anode 114. Anode 114 can be coupled to a conductive element 116 and configured to transport the electrons to a location downstream of plasma flow 112. Another terminal such as a cathode 118 can be coupled to the other end of conductive element 116 at a downstream location, where the electrons can be re-inserted into plasma flow 112 to neutralize the charge of flow 112. A load 120 can be interposed between anode 114 and cathode 118 to extract energy from the current flowing externally between them. Controller 102 can be configured to receive information from one or more sensor(s) 122 regarding the characteristics of flow 112 within housing 109 and/or at some downstream location, and control operation of load 120, plasma generator 104, electric field generator 106, and magnetic field generator 108.

Controller 102 can operate electric field generator 106 to provide a continuous, varying, and/or periodically intermittent electric field. When a pulsed electric field is applied, a series of plasma vortices issue from cavity 110, depending on the configuration of housing 109. When a steady electric field is applied, a steady jet of plasma flow 112 issues from cavity 110. The strength and/or the pulse frequency of the electric field can be varied, depending on the force required from plasma flow 112.

Controller 102 is typically a processing system that can be embodied in any suitable computing device(s) using any suitable combination of firmware, software, and/or hardware, such as microprocessors, Field Programmable Gate Arrays (FPGAs), Application Specific Integrated Circuit (ASICs), or other suitable devices. Controller 102 can be coupled to a power supply (not shown) to control the application of power during operation of plasma generator 104, electric field generator 106, and magnetic field generator 108. One or more feedback sensors (not shown) can be coupled to provide controller 102 with information such as pressure, temperature, conductivity, field strength, and/or other parameters of plasma in cavity 110, and velocity of plasma flow 112. Controller 102 can adjust the power supplied to regulate plasma flow 112 as desired.

Any suitable component or combination of components can be used for plasma generator 104, electric field generator 106, and magnetic field generator 108. For example, plasma generator 104 can be implemented by strong electric fields, electron beams, microwaves, and other phenomena and/or components capable of generating plasma. The plasma generator 104 can inject energy, such as electron beams or alpha, beta, or gamma beams from decay of radioactive isotopes into cavity 110 through windows or other suitable structures to ionize incoming flow. For example, in some configurations, thin metallic foils with passive cooling can be utilized. In other configurations with electron beams of relatively high current densities, either active cooling or plasma windows can be utilized. The structures through which plasma generator 104 injects ionizing energy typically comprise only a portion of one or more walls of housing 109 and can be configured using any suitable number, shape, and location on housing 109.

Housing 109 is open at both ends to allow flow to enter one end and exit the other. The incoming flow can be any suitable liquid, gaseous, and/or solid substance(s) supplied from any suitable source(s). For example, the incoming flow can be supplied from an inlet on a flight vehicle capturing free stream airflow, and/or a secondary or auxiliary source such as a tank of compressed gas or fluid (not shown), as might be required of an exoatmospheric vehicle. The incoming flow can also be supplied by diverting a portion of a primary flow in addition to, or instead of, being supplied from a secondary source.

Figure 2:
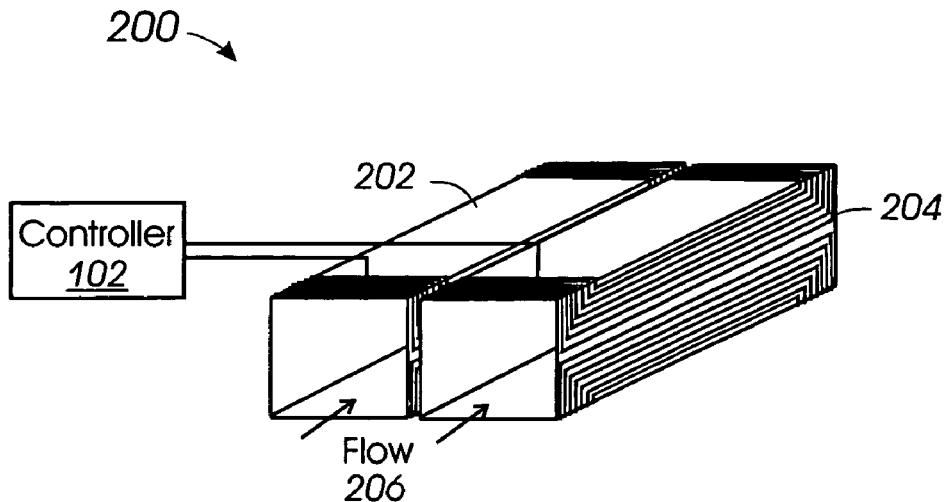
FIG. 2 is a diagram of an embodiment of components that can be included in the plasma propulsion system of FIG. 1.

Referring to FIG. 2, an embodiment of components that can be included in some embodiments of plasma propulsion system 100 (FIG. 1) is shown. Two or more housings 202 can be configured with one or more magnet devices 204 that can be operated by controller 102 to create a transverse magnetic field normal to the direction of flow 206, thereby performing the functions of magnetic field generator 108 (FIG. 1). Magnet devices 204 such as permanent magnets, electromagnets, and/or superconducting magnets operating continuously or intermittently can be used to generate a magnetic field that is aligned approximately normal to the electric field E and flow 206, or in any other suitable orientation. Other suitable devices for generating a magnetic field can be used, in addition to, or instead of, magnet devices 204.

In the embodiment shown, magnet devices 204 are current carrying conductors positioned along a substantial portion of the length of each housing 202 parallel to the direction of flow 206. The axial flow of current produces a transverse magnetic field in housings 202. The conductors are connected together around the ends of the housings 202 to provide current continuity and to avoid interfering with flow 206. The magnetic fields can be oriented opposite one another by driving the current through the conductors in different directions. Such an arrangement increases efficiency by allowing at least part of the return flux from one housing 202 to augment the magnetic field in the adjacent housing 202. Additionally, the arrangement can balance any transverse forces that might occur in one housing 202 and in the opposite direction in the other housing 202.

Although magnet devices 204 are shown distributed over the length of housings 202, one or more magnet devices 204 can be positioned in any one or more suitable locations relative to housings 202, and in any other suitable configuration. Additionally, any number of housings 202 can be arranged in different configurations.

Figure 3:
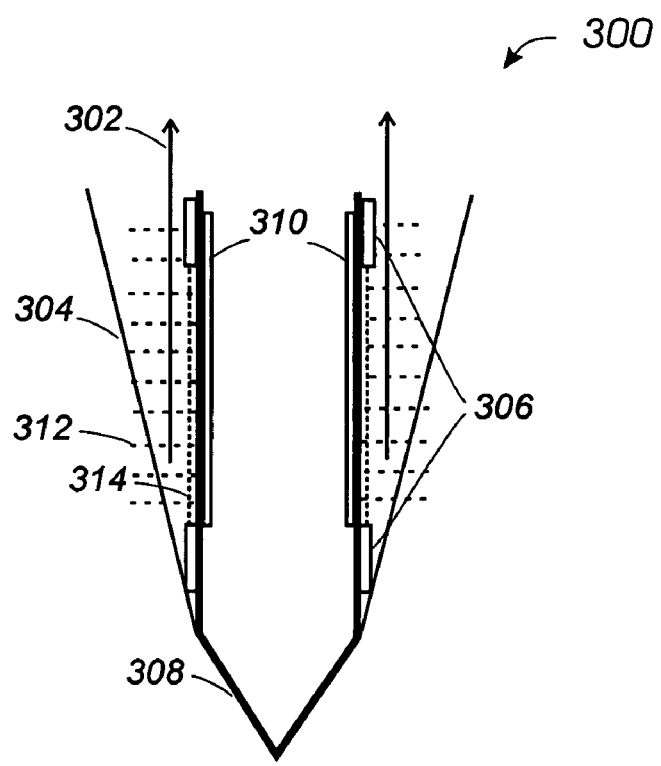
FIG. 3 is a diagram of an embodiment of a plasma propulsion system in which a housing for the propulsion system is formed by pressure shock waves emanating from a flight or other vehicle structure in supersonic or hypersonic flight.

Referring to FIG. 3, another embodiment of a plasma propulsion system 300, also referred to as a "conformal PFE", is shown in which fluid flow 302 is contained by phenomenological features in the flowing air, such as the structure of shock waves 304 shed by the nose of housing 308 and/or other elements of the structure on which system 300 is mounted. The conformal PFE embodiment is useful on flight devices at supersonic or hypersonic speeds, and for application to and within the boundary layers of vehicles at all speeds. Electric field generators, such as one or more alternating anode/cathode pairs 306, can be positioned external to housing 308 of system 300. Magnetic field generators 310 can be positioned within housing 308 to radiate lines of magnetic flux 312 transverse or in any other suitable direction to electric field 314. A plasma generator (not shown) can also be positioned within housing 308 to radiate energy to ionize flow 302. While a configuration such as system 100 shown in FIG. 1 is required for operation in incompressible flow regimes, the free air configuration of system 300 is attractive for high and variable Mach number operating regimes because the parasitic drag will be lower. Additionally, system 300 will not be subject to choked flow conditions in which the cross-section of housing 308 cannot accommodate the entire quantity of fluid flow 302.

Figure 4:
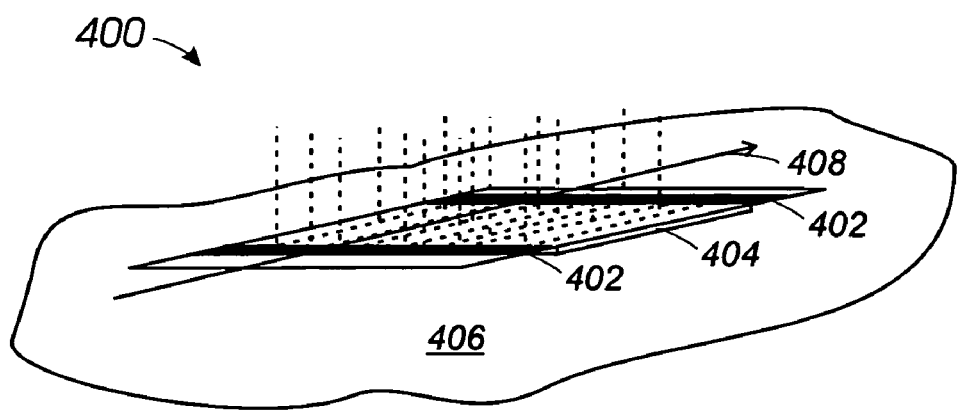
FIG. 4 is a diagram of another embodiment of a plasma propulsion system that can be configured to conform to the surface of a flight vehicle or other object.

Referring to FIG. 4, another embodiment of a plasma propulsion system 400 is shown including a flat or nearly flat sheet with electric field generator 402, such as an anode/cathode pair, magnetic field generator 404, plasma generator (not shown), and a controller (not shown). System 400 can be configured to conform to the outer mold line (OML) of a surface 406 on which it is mounted, forming another embodiment of a conformal PFE that draws air from the boundary layer of flow 408. As used herein, the term boundary layer refers to the layer of reduced velocity in fluids, such as air and water, which is immediately adjacent to the surface past which the fluid is flowing. The reduced velocity is a natural form of compression and can, therefore, serve as the inlet and housing of system 400. At hypersonic speeds, the boundary layer may be a millimeter thick or less so the total cross sectional area is not likely to be sufficient to serve as the main propulsive engine, depending on the design. Shock waves emanating from surface 406 can also be used to form a housing for system 400. System 400 can reduce or eliminate friction drag over the region where system 400 operates, however. Friction drag regulation may also be used to influence the direction of movement of the device through the flow, in addition to, or instead of, conventional fluid dynamic control surfaces.

Thus, in some embodiments of plasma propulsion systems 100, 200, 300, 400, freestream flow is passed through an appropriate inlet (not shown) to achieve the optimal state with respect to temperature and compression. This optimal state depends on sizing parameters selected by the designer, but is generally high altitude (100 thousand feet or more) and high speed (Mach 3 plus). As the plasma is accelerated, it draws new, non-ionized air through the electric field, so that the cycle can begin again. Acceleration of the charged particles adds momentum to the flow. Diffusion of this momentum throughout the flow occurs by means of collisions between ions and neutral air molecules. These collisions, while they conserve linear momentum, also dampen ion velocities and create some heat. Thus the flow exits the housing in a hot, under-expanded state. So, additional thrust can be generated if the exhaust is further expanded through a nozzle (not shown).

An initiating ionization pulse, referred to as "seeding", can be provided by one or more external sources that supply energy to the flow, such as a radio-isotope or a dedicated thermal emission cathode, or including an ionizing feature in the configuration of the system, such as a high-field laser pulse or a high energy electron gun, among others. The energy pulse that creates most ions can arise from a collision between a neutral molecule and an accelerated electron. The term electron avalanche refers to a chain reaction in which one electron strikes a neutral molecule and knocks another electron loose, creating an ion and leaving two free electrons. The electric field then accelerates these two electrons, and they each strike neutral molecules creating an ion each and leaving four electrons. The electrons are then accelerated and collided to create four ions and eight electrons, and so forth. Often, there will be natural ions that initiate the avalanche, although the process can be seeded to achieve an appropriate distribution of charges throughout the housing. The avalanche can be dampened by removing electrons from the chamber at strategic points with electrodes, by encouraging recombination or by other means.

In some embodiments, high temperature gas from an onboard electric plant, such as a high temperature fuel cell, can be injected into the flow. The injected gas can serve as a "cathode" as well as a seeder of electrons. Because the energy of the molecules in a hot gas is distributed around the average temperature, hot gases contain more ions than cool gases. The combination of fluid dynamic air heating at hypersonic speeds and temperature addition from the electric plant allows avalanches to be promoted or dampened at will.

The magnetic field converts the linear motion of electrons into helical motion. So the electron power manifests in heat and angular momentum. Since the relative mass of an electron is small compared to an ion, the amount of angular momentum from the electron is small enough to be ignored. The heat created by the electron current, on the other hand, may represent a substantial portion of the input power. The ion power is equal to the complement of the electron power and adds linear momentum and a small amount of angular momentum, along with heat because the ions collide with neutrals in the flow. Accordingly, a thermodynamic cycle can be overlayed on a plasma propulsion system to capture that heat and covert it to thrust.

The proportion of energy that is converted to heat can be turned back into momentum by an overlaid thermodynamic cycle established by allowing the plasma to expand through a nozzle, and that fraction of the engine's performance, is subject to the Carnot efficiency limit. The Carnot limit constrains the efficiency of a heat engine to the complement of the ratio of the cold temperature to the hot temperature, so a heat engine cannot achieve perfect efficiency unless its high temperature is infinite or its low temperature is (absolute) zero. Accelerating an ion in an electric field raises the ion's kinetic energy but does not raise the ion's temperature in the sense of the random component of its velocity. Thus, accelerating the ion through an electric field can be perfectly efficient. As a result, the most efficient plasma propulsion drives are those where the amount of energy that goes into the field acceleration of the ions is maximized, which occurs when the fraction of air that is ionized is at its maximum or near it. However, as the ionization fraction climbs, the efficiency closely approaches unity well before ionization fraction reaches even 10%; so the energy cost of complete ionization is never justified.

Figure 5:
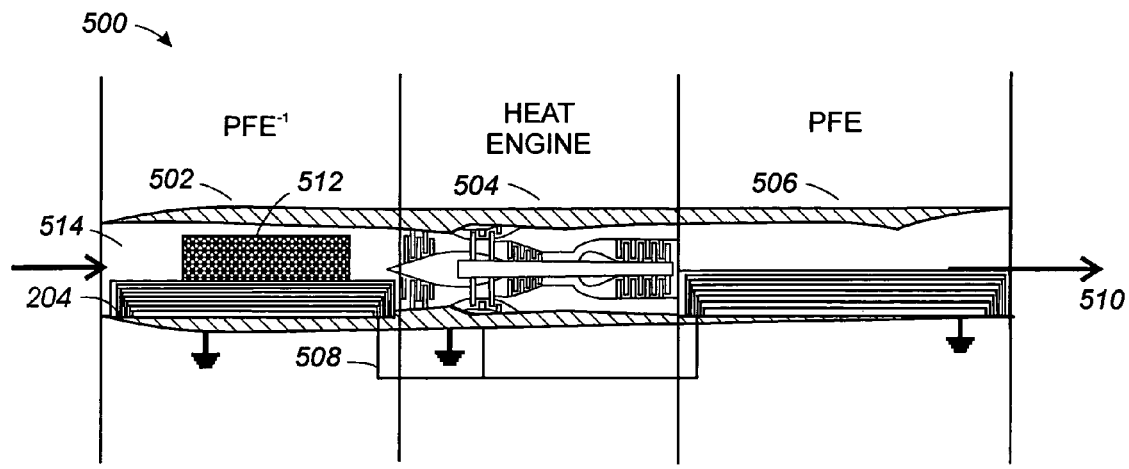
FIG. 5 is a diagram of another embodiment of a plasma propulsion system showing a heat engine coupled between plasma accelerators.

FIG. 5 shows another embodiment of a plasma propulsion system 500 that includes an energy bypass inlet in the form of an inverted PFE (PFE$^{-1}$) 502, heat engine 504, and PFE 506 in series. PFE 506 and PFE$^{-1}$ 502 can include components similar to those discussed herein in connection with propulsion systems 100, 200, 300, and 400. However, the electric field in PFE$^{-1}$ 502 is oriented to decelerate the ion flow rather than accelerate it, thus, extracting energy from the flow. The electric power resulting from thusly extracting energy from the flow can then be re-injected via PFE 506 operating to accelerate the ion flow after the flow has passed through heat engine 504. PFE$^{-1}$ 502 can be configured to condition the flow to match the operation of turbine engine 504 to enable such an engine 504 to operate at speeds above Mach 4.

An air molecule entering the PFE$^{-1}$ 502 at high speed (with high kinetic energy) is first ionized, either by passing through a shock wave or by application of some ionization energy, such as from a colliding electron, photon, etc, or both. The electron resulting from this ionization carries away with it the ionization energy but very little of the fluid kinetic energy because of the mass difference of the electron and ion and the fact that only a small fraction of the air molecules are ionized. As a result, the rest of the air molecules continue at high speed through the propulsion system 500, entraining and carrying the ion along by colliding with it. By contrast the progress of the electron through the engine, is impeded by a magnetic field generated by a suitable device, such as magnet devices 204. The ions which are traveling at a speed typically less than Mach 25 have no more than 8.5 electron-Volts (eV) of energy, which is in the thousands of meters per second range. So the magnetic field affects the electrons much more than the ions, just as in PFE 506. The electrons spiral along the magnetic field lines to anode(s) and are conducted into circuit 508, and then recycled back into the flow downstream to neutralize exhaust flow 510. The ions travel axially through propulsion system 500 with the airflow, thereby creating charge separation. The electrical potential difference resulting from the charge separation allows energy to be harvested.

PFE$^{-1}$ 502 therefore produces power and can serve as a power source for any system onboard the aircraft, including PFE 506. PFE$^{-1}$ 502 also serves to pull energy out of the incoming airflow, reducing the total temperature of the airflow. The cooled flow is valuable for use as the inflow air for onboard cooling of leading edges, electronics, and personnel, and also as inlet air for chemical heat engines 504 such as a turbine engine, piston engine, and ramjet or scramjet engines, which may provide the primary thrust for the aircraft.

The amount of kinetic energy that can be extracted from the airflow is proportional to the percentage of molecules that are ionized. If all molecules are ionized, all the kinetic energy can be recovered, leaving only the energy required to ionize the gas to be supplied. If less than all molecules are ionized, then the energy that remains is divided among kinetic, thermal, and pressure energy. As a smaller and smaller fraction of the molecules are ionized, the role of thermal energy (for any given velocity regime) becomes more important. In general, the operational regime of the PFE$^{-1}$ can be selected so that thermal energy is not a significant consideration.

In some embodiments, when PFE$^{-1}$ 502 has extracted all the energy possible from the flow, the electrons captured off the magnetic field lines at the front of the PFE$^{-1}$ 502 are re-emitted into the flow to neutralize the ions downstream. When the electrons are recombined with their ions, they also release a photon. This recombination is the reverse process of ionization and is called "radiative recombination". In theory, the radiative recombination energy is exactly equal to energy of ionization and, if this portion of the cycle were perfect, the ionization/recombination cycle would consume no net energy.

The efficiency of $PFE^{-1}$ 502 can be increased by including solid-state heat-to-power converters, such as thermophotovoltaic (TPV) collectors 512 lining the walls of $PFE^{-1}$ 502, or other suitable device(s) that recapture the thermal radiation from the waste heat as well as the recombination. The portion of energy recovered with TPV collectors 512 can be quite significant, as further discussed herein.

Thus, as airflow passes through $PFE^{-1}$ 502, 1) the airflow is ionized by a process that adds negligible energy to the ions because nearly all the energy of ionization is carried off with the emitted electrons; 2) the ions then pass through an adverse electric field, causing the ions to decelerate; 3) however, as the ions slow, they are bombarded by neutral molecules that transfer some of their kinetic energy forcing the ions to keep up with the flow; and) the transfer of kinetic energy into the ions cools the neutrals. The electrons, carrying the ionization energy manifest as kinetic energy or velocity, are "captured" by the magnetic field and spiral through that field into an anode where they are absorbed as "hot" or "extra-energetic" electrons. Two or more lower energy, cooler particles (electron-hole pairs or "excitons") are created when the electrons crash into the anodes and are passed to circuit 508. Eventually 5) the ions pass into a region where electrons from circuit 508 are re-emitted into the ion flow to neutralize the ions. The electrons are emitted at low temperature from a cathode with a low work function, for example, less than 1.5 eV. And, 6) as the recombination occurs, the extinguished ions release a photon, more or less equal in energy to the respective ionization energy.

Note that none of processes 1-6 of the foregoing cycle are, or need be thermodynamic in the sense that no phase of the cycle depends on any pressure or volume change in the working fluid for kinetic energy to be harvested. Changes in the thermodynamic potentials of the gas flow do occur but they are incidental to, rather than fundamental to harvesting energy.

Heat engine 504 performs compression and combustion cycles to expand the airflow through a nozzle by raising the temperature of the airflow. Some heat engines 504, such as a turbine engine, can include a turbine section or other means to siphon off a portion of the output to power the compressor, thereby consuming some of the power it produces during operation. The expanded and accelerated airflow from engine 504 enters PFE 506, which further accelerates the flow by adding work (not heat) to achieve the total velocity required. Exhaust flow 510 enters the atmosphere, producing thrust, and returning the total temperature of the airflow back to ambient. PFE 506 is powered by the combined electricity produced by $PFE^{-1}$ 502 and TPV collectors 512 or other suitable heat-to-power converters.

While heat engine 504 coupled between $PFE^{-1}$ 502 and PFE 506 provides one way to generate the net power addition required for net thrust, other suitable configurations can be used in which the electric power is produced directly by an onboard source such as a battery, supercapacitor, nuclear power plant, fuel cell, or other suitable power source. If the electric power to energize the PFE is produced by other than a heat engine, it may not be necessary to include a $PFE^{-1}$ portion to the cycle, though some $PFE^{-1}$ effects may be advisable, as further discussed herein.

Figure 6:
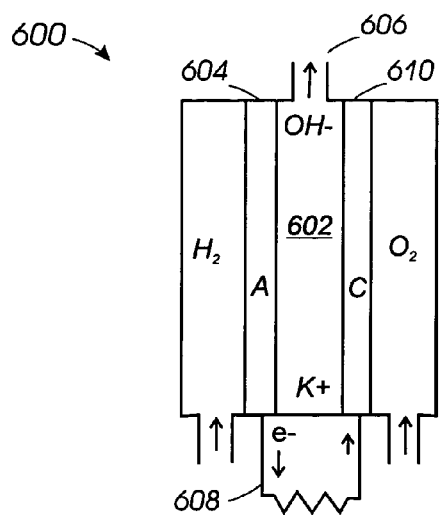
FIG. 6 is a diagram of an embodiment of a generic fuel cell.

Referring to FIG. 6, an embodiment of a fuel cell 600 is shown that includes a membrane or electrolyte 602 that separates the electron from an air molecule and passes the hydrogen ion (i.e., proton in a hydrogen/oxygen cell), but will not pass electrons. The ion is attracted through electrolyte 602 to anode 604, where it undergoes a chemical reaction that creates water vapor. The water molecule, too big to pass back through electrolyte 602, is flushed from the cell through an exhaust port 606. This reaction results in electrons that are left over. These electrons flow into the anode and produce an electric current that is conducted through circuit 608. At cathode 610, oxygen and water plus returning electrons from circuit 608 form hydroxide ions which are again recycled back to anode 604. The reactions are driven by a series of electrochemical potentials such that, at every stage, the forward reaction is more probable than the reverse one. There are many different types of fuel cells, with fuel cell 600 being just one example used to explain the basic concepts of fuel cell operation.

In PFE 506, as well as systems 100, 200, 300, and 400, the ionized fluid (dilute plasma) forms a conductor and the electrons and ions are transported through the plasma between anode particles and cathode particles, which are each distributed throughout the plasma. Similarly, fuel cell 600 hosts two contra-flowing currents. Like the air diluting the plasma of PFE 506, the fuel cell's electrolyte 602 is a neutral, non-conductive medium through which charged particles are transported in one direction but not in the reverse direction. Both fuel cell 600 and PFE 506, then, require a separation and counter flow of charges. For fuel cell 600, the separation must be large and of long duration so that electrons can run through an external circuit and do work. For PFE 506, the separation need only be for a moment long enough so that the field thus generated can do work by accelerating the ions and electrons.

Note that both fuel cell 600 and PFE 506 as well as systems 100, 200, 300, and 400, include an electric field structure, the presence of oxygen in the air, and the presence of ionization mechanisms that generate ions and electrons from the molecules. Additionally, the function of the magnetic field in PFE 506 is similar to that of membrane 602, which allows ions to pass in only one direction (axially aft) while capturing electrons. The electrons can only recombine with the ions in the exhaust flow 510 via the anode and conducting circuit 508.

Figure 7:
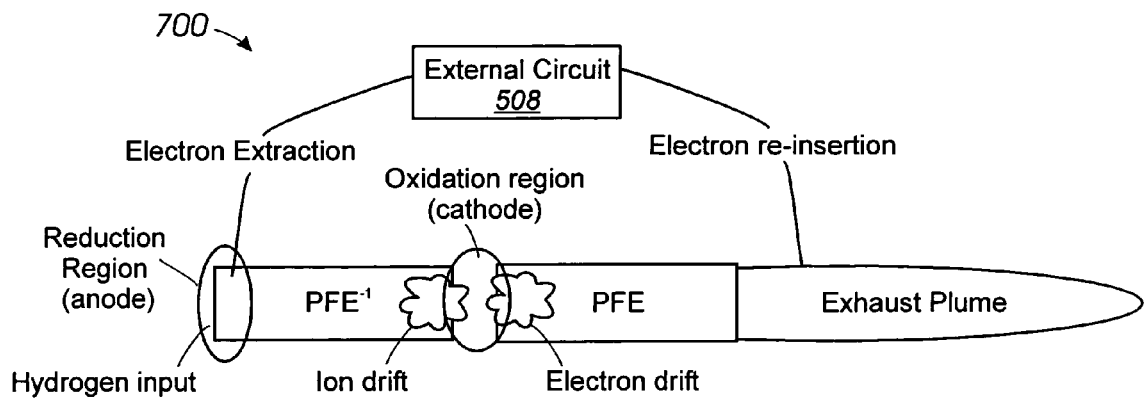
FIG. 7 is a diagram of another embodiment of a plasma propulsion system in which two plasma accelerators are conjoined, the first one operating in reverse mode as a fuel cell, thus combining the function of the reverse plasma accelerator and heat engine of FIG. 5 in a single stage.

Referring to FIG. 7, an embodiment of plasma propulsion system 700 is shown in which chemical energy can be supplied in the form of a suitable fuel near the inlet of $PFE^{-1}$. For example, a hydrogen compound can be introduced with a larger collision cross section than single protons; for example, methane ($CH_4$). The methane ions are driven toward the exhaust of $PFE^{-1}$ by the entraining airflow, while the electrons spiral along magnetic field lines to anodes along the walls of $PFE^{-1}$, creating the charge separation. The supply of ionized fuel could be one or more of hydrogen, hydrocarbon, or other oxidizable fuel, and alkaline metal (Group One elements in the Table of Elements).

Note that no energy has been expended to ionize air at this point. The hydrogen, however, is ionized at a cost of approximately 13 electron-Volts per ion. For every proton (assuming hydrogen fuel), there is an electron flowing in external circuit 508. Four protons and four electrons are required for a complete fuel cell reaction, forming two $H_2O$ molecules. In some embodiments, the electrons can be reintroduced to serve as a reactant in the oxidation reaction further downstream in $PFE^{-1}$, at the inlet to PFE, and/or the exhaust of PFE.

Reduction/ionization processes occur at the inlet to the $PFE^{-1}$ and at the inlet of the PFE, where the terms "reduction" and "ionization" refer to the process of releasing electrons into the reacting media by a reducing agent like hydrogen, thereby "ionizing" the working fluid. Likewise, the completion of the reaction (oxidation) takes place at the aft end of the $PFE^{-1}$ and the aft end of the PFE, where the terms "completion" and "oxidation" refer to the process of absorbing free electrons from the reacting media by oxidants like oxygen, thereby "de-ionizing" the working fluid.

Figure 8:
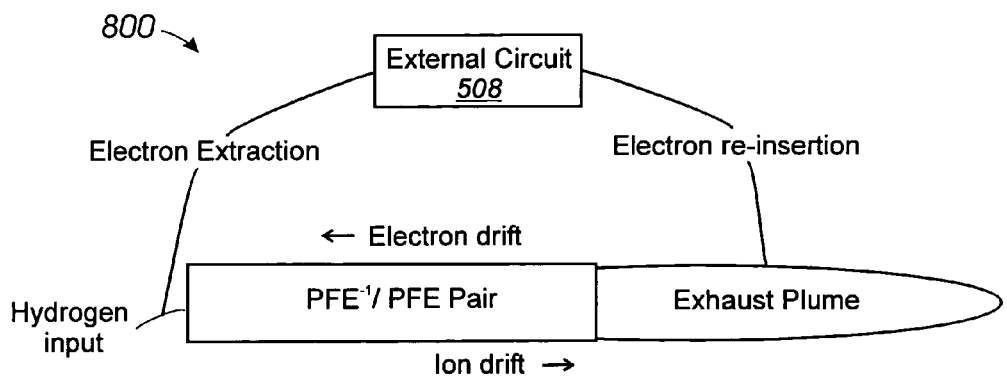
FIG. 8 is a diagram of another embodiment of a plasma propulsion system in which the plasma accelerators of FIG. 7 are merged in a single structure.

Referring to FIG. 8, another embodiment of plasma propulsion system 800 is shown that combines the $PFE^{-1}$ and PFE so that there is only one region of "reduction" serving both PFE and $PFE^{-1}$ and one region of oxidation, which also serves both. A single volume can thus be used for both the $PFE^{-1}$ and PFE portions. The merged $PFE^{-1}$/PFE pair (also referred to as PFE/FC, where FC alludes to the term "fuel cell") can operate without generating any more heat than a fuel cell, which in the idealized case is no heat at all. While a hydrogen fuel cell may operate at a few hundred degrees, it is far lower in temperature than the thousands of degrees where a hydrogen combustion jet operates.

As an example, in some embodiments of system 800, assuming an operating temperature of approximately 1200 Kelvin, an enthalpy of −249 kilojoules per mole, where the term enthalpy refers to a thermodynamic function of a system, equivalent to the sum of the internal energy of the system plus the product of its volume multiplied by the pressure exerted on it by its surroundings. The entropy (which refers to the amount of thermal energy not available to do work) may be approximately −0.056 kilojoules per mole Kelvin (about −67 kJ). The net result is 181 kJ per mole of thrust may be provided by system 800.

As a further example, a rate of airflow for system 800 of 1 meter in diameter operating at 150 thousand feet (about 1 torr of pressure) and traveling at Mach 20 yields an oxygen flow rate of 1.67 kg/sec. If the stoichiometry (ratio of total oxygen flow to oxygen flow needed) of the fuel cell is 2.0, for example, then the useful oxygen flow rate is 0.834 kg/sec (26 mole/sec). With such an airflow, an electrical current of 10,000 kA (kilo-amps) can be developed by system 800. The total power produced by the $PFE^{-1}$ portion of the cycle then will depend on the potential drop across the cycle, which in turn depends on the engine length at the rate of 10 MW (mega-watt) per volt of potential drop. A potential drop of magnitude $10^1$ or $10^2$ of volts will provide power output in the gigawatt (GW) range.

Propulsion system 500 and, in particular, system 800 are fuel efficient at high speed and high altitude, and thus can enable hypersonic flight with global range. Propulsion systems 500, 800 are distinct from a scramjet because thrust from propulsion systems 500, 800 is a result of the direct, mechanical acceleration of a small portion of the molecules of air by an electric field and not a result of the heating and expansion of the full air mass by addition of thermal energy. Accordingly, the size of the inlet may be reduced compared to conventional engine configurations. Systems 500 and 800 are also likely to be much lighter and more compact, simpler and more robust, and much less expensive than known systems.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. A plasma propulsion system, comprising:
a housing including an opening through which a fluid is introduced in the housing;
a first electric field generator coupled to accelerate ions of an ionized fluid in the housing toward another opening in the housing;
a magnetic field generator configured to generate a magnetic field in the housing, wherein the magnetic field is oriented to decelerate electrons that would otherwise be accelerated in a direction opposite the ions in the housing; and
a controller coupled to control the electric field produced by the first electric field generator, thereby accelerating the ionized fluid through the other opening in the housing.

2. The plasma propulsion system of claim 1, wherein the magnetic field generator includes an electrical conductor configured along at least a portion of the length of the housing, and the magnetic field is produced when electrical current is applied to the electrical conductor.

3. The plasma propulsion system of claim 1, wherein the housing is generated by pressure shock waves in the fluid.

4. The plasma propulsion system of claim 1, wherein the housing is generated by a boundary layer of the fluid.

5. The plasma propulsion system of claim 1, further comprising:
a second electric field generator coupled to decelerate the ionized fluid in an upstream location in the housing; and
a second magnetic field generator configured to generate a magnetic field in the upstream location in the housing, wherein the magnetic field is oriented to decelerate electrons in the housing.

6. The plasma propulsion system of claim 5, further comprising:
a heat engine coupled between the first and second electric field generators.

7. The plasma propulsion system of claim 4, further comprising:
a circuit coupled to conduct the electrons to the other opening in the housing and release the electrons into the ionized flow to re-establish charge neutrality of the flow.

8. The plasma propulsion system of claim 1, further comprising:
an inlet configured to receive an ionized fuel; and
a circuit configured to collect electrons separated from a fuel as the fuel is ionized to generate the ionized fuel, and to release the electrons in the ionized flow exhausted at the other opening.

9. The plasma propulsion system of claim 8, further comprising:
a second electric field generator coupled to decelerate the ionized fluid in an upstream location in the housing.

10. The plasma propulsion system of claim 9, further comprising:
a heat engine coupled between the first electric field generator and the second electric field generator.

11. The plasma propulsion system of claim 1, further comprising:
a plasma generator coupled to ionize the fluid, thereby generating the ionized fluid.

12. The plasma propulsion system of claim 1, further comprising:
a sensor coupled to provide information regarding one or more characteristics of the ionized fluid to the controller.

13. The plasma propulsion system of claim 1, further comprising:
a heat-to-power converter device coupled to extract heat from the fluid entering the housing, and convert the heat to electrical power.

14. A method comprising:
accelerating ions of a plasma through a first electric field in a housing, wherein the housing includes an opening and the electric field is oriented in the direction of the ions to accelerate the ions in the direction of the opening, thereby forming a plasma flow; and
generating a magnetic field orthogonal to the electric field, wherein the magnetic field is oriented to decelerate electrons that would otherwise be accelerated in a direction opposite the ions in the housing.

15. The method of claim 14 further comprising:
decelerating the plasma through a second electric field, wherein the second electric field is located upstream of the first electric field;
collecting the electrons separated from a fluid after the fluid is ionized to create the plasma; and
reinserting the electrons into the plasma after the plasma is accelerated by the first electric field.

16. The method of claim 15 wherein the fluid includes a chemical fuel.

17. The method of claim 15 further comprising:
providing the plasma decelerated by the second electric field to a heat engine, wherein the heat engine is coupled between the first and second electric fields.

18. An apparatus comprising:
means for accelerating a plasma through a first electric field in a housing, wherein the housing includes an opening and the electric field is oriented to accelerate the ions of the plasma in the direction of the opening, thereby forming a plasma flow;
means for generating a magnetic field, wherein the magnetic field is oriented to decelerate electrons that would otherwise be accelerated in a direction opposite the ions in the housing;
means for collecting the electrons separated from a fluid after the fluid is ionized to create the plasma; and
reinserting the electrons into the plasma after the plasma is accelerated by the first electric field.

19. The apparatus of claim 18 further comprising:
means for decelerating a plasma through a second electric field, wherein the second electric field is located upstream of the first electric field.

20. The apparatus of claim 19 wherein the fluid includes a chemical fuel.

21. The apparatus of claim 19 further comprising:
a heat engine coupled between the first and second electric fields.

* * * * *

(12) EX PARTE REEXAMINATION CERTIFICATE (8690th)
United States Patent
Allen

(10) Number: US 7,509,795 C1
(45) Certificate Issued: Nov. 22, 2011

(54) SYSTEMS AND METHODS FOR PLASMA PROPULSION

(75) Inventor: Edward H. Allen, Lancaster, CA (US)

(73) Assignee: Lockheed Martin Corporation, Bethesda, MD (US)

Reexamination Request:
No. 90/011,660, Apr. 26, 2011

Reexamination Certificate for:
Patent No.: 7,509,795
Issued: Mar. 31, 2009
Appl. No.: 11/036,719
Filed: Jan. 13, 2005

(51) Int. Cl.
*F03H 1/00* (2006.01)

(52) U.S. Cl. .......................................... 60/202

(58) Field of Classification Search .................. None
See application file for complete search history.

(56) References Cited

To view the complete listing of prior art documents cited during the proceeding for Reexamination Control Number 90/011,660, please refer to the USPTO's public Patent Application Information Retrieval (PAIR) system under the Display References tab.

*Primary Examiner* — Jeffrey R. Jastrzab

(57) ABSTRACT

A plasma propulsion system for aerospace and other applications is disclosed in which an ionized fluid is accelerated through the system by an electric field. The electrons separated from the ionized fluid are accelerated in a direction opposite the ionized flow. A magnetic field decelerates the electrons. The decelerated electrons are collected, conducted downstream, and re-inserted into the ionized flow.

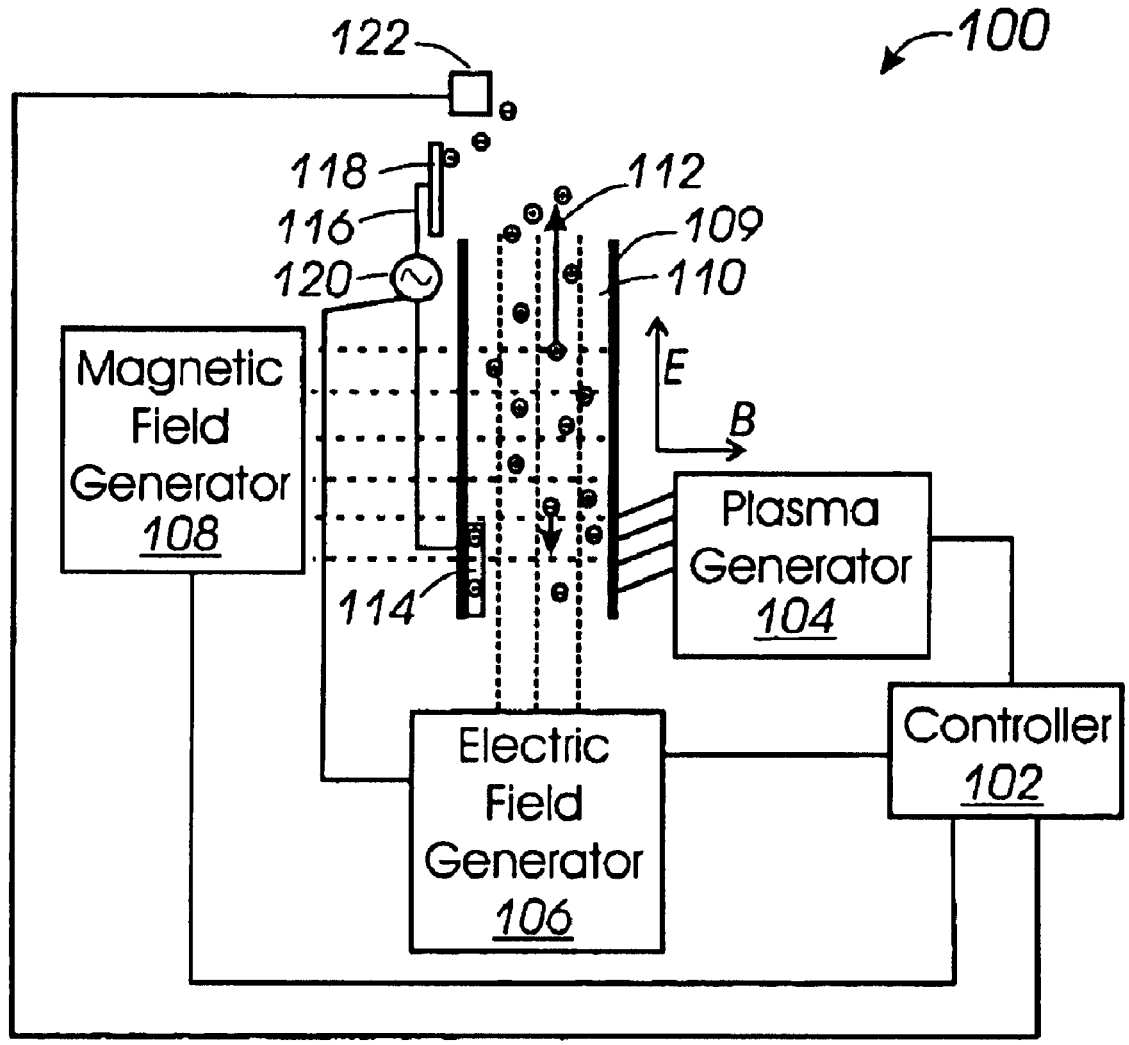

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 9 and 15 are cancelled.

Claims 1, 6, 10, 14, 16 and 17 are determined to be patentable as amended.

Claims 2-4, 7, 8 and 11-13, dependent on an amended claim, are determined to be patentable.

Claims 18-21 were not reexamined.

1. A plasma propulsion system, comprising:
   a housing including an opening through which a fluid is introduced in the housing;
   a first electric field generator coupled to accelerate ions of an ionized fluid in the housing toward another opening in the housing;
   a magnetic field generator configured to generate a magnetic field in the housing, wherein the magnetic field is oriented to decelerate electrons that would otherwise be accelerated in a direction opposite the ions in the housing; [and]
   a controller coupled to control the electric field produced by the first electric field generator, thereby accelerating the ionized fluid through the other opening in the housing;
   *a second electric field generator coupled to decelerate the ionized fluid in an upstream location in the housing; and*
   *a second magnetic field generator configured to generate a magnetic field in the upstream location in the housing, wherein the magnetic field in the upstream location is oriented to decelerate electrons in the housing.*

6. The plasma propulsion system of claim [5] *6*, further comprising:
   a heat engine coupled between the first and second electric field generators.

10. The plasma propulsion system of claim [9] *1*, further comprising:
    a heat engine coupled between the first electric field generator and the second electric field generator.

14. A method comprising:
    accelerating ions of a plasma through a first electric field in a housing, wherein the housing includes an opening and the electric field is oriented in the direction of the ions to accelerate the ions in the direction of the opening, thereby forming a plasma flow; [and]
    generating a magnetic field orthogonal to the first electric field, wherein the magnetic field is oriented to decelerate electrons that would otherwise be accelerated in a direction opposite the ions in the housing;
    *decelerating the plasma through a second electric field, wherein the second electric field is located upstream of the first electric field;*
    *collecting the electrons separated from a fluid after the fluid is ionized to create the plasma; and*
    *reinserting the electrons into the plasma after the plasma is accelerated by the first electric field.*

16. The method of claim [15] *14* wherein the fluid includes a chemical fuel.

17. The method of claim [15] *14* further comprising:
    providing the plasma decelerated by the second electric field to a heat engine, wherein the heat engine is coupled between the first and second electric fields.

* * * * *